(12) United States Patent
Feldman (10) Patent No.: US 10,535,044 B2
(45) Date of Patent: Jan. 14, 2020

(54) AUTHENTICATION OF TRANSACTIONS IN A NETWORK

(75) Inventor: Marc Feldman, Woodland Hills, CA (US)

(73) Assignee: INTUIT INC., Mountain View, CA (US)

( * ) Notice: Subject to any disclaimer, the term of this patent is extended or adjusted under 35 U.S.C. 154(b) by 2227 days.

(21) Appl. No.: 12/684,634

(22) Filed: Jan. 8, 2010

(65) Prior Publication Data

US 2011/0173124 A1 Jul. 14, 2011

(51) Int. Cl.
*G06Q 20/10* (2012.01)

(52) U.S. Cl.
CPC .................... *G06Q 20/10* (2013.01)

(58) Field of Classification Search
CPC ............... G06Q 20/10; G06Q 30/0207–0277
USPC ............................................................ 705/64
See application file for complete search history.

(56) References Cited

U.S. PATENT DOCUMENTS

| | | | | |
|---|---|---|---|---|
| 6,098,053 | A * | 8/2000 | Slater | 705/44 |
| 6,931,382 | B2 * | 8/2005 | Laage et al. | 705/67 |
| 7,039,809 | B1 * | 5/2006 | Wankmueller | 713/182 |
| 7,299,408 | B1 | 11/2007 | Daconta | |
| 7,451,917 | B2 * | 11/2008 | McCall et al. | 235/379 |
| 7,827,115 | B2 * | 11/2010 | Weller et al. | 705/78 |
| 7,890,393 | B2 * | 2/2011 | Talbert et al. | 705/35 |
| 2002/0035539 | A1 * | 3/2002 | O'Connell | 705/39 |
| 2002/0073022 | A1 * | 6/2002 | Wisecarver et al. | 705/38 |
| 2005/0071282 | A1 * | 3/2005 | Lu | G06F 21/42 705/64 |
| 2007/0228148 | A1 * | 10/2007 | Rable | 235/379 |
| 2007/0282756 | A1 * | 12/2007 | Dravenstott et al. | 705/72 |
| 2008/0027874 | A1 * | 1/2008 | Monseignat et al. | 705/74 |
| 2008/0040274 | A1 * | 2/2008 | Uzo | 705/44 |
| 2008/0189214 | A1 * | 8/2008 | Mueller et al. | 705/65 |
| 2008/0283591 | A1 * | 11/2008 | Oder et al. | 235/380 |
| 2009/0106138 | A1 | 4/2009 | Smith | |
| 2011/0082800 | A1 * | 4/2011 | Baghdasaryan | G06Q 20/10 705/75 |

* cited by examiner

FOREIGN PATENT DOCUMENTS

| | | |
|---|---|---|
| JP | 2002082910 A | 3/2002 |
| KR | 20060018792 A | 3/2006 |

OTHER PUBLICATIONS

European Office Action dated Jul. 11, 2017 for Application No. 10842743.6.

*Primary Examiner* — Chrystina E Zelaskiewicz
(74) *Attorney, Agent, or Firm* — Patterson + Sheridan, LLP (57) ABSTRACT

A technique for conducting a transaction via a network is described. In this technique, in response to receiving transaction information associated with the transaction via the network from a network browser in a computer, a computer system provides an encrypted version of the received transaction information via the network to an application that executes in the computer, which facilitates a comparison of the received transaction information with original transaction information provided by a user to the computer. Note that this application is separate from the network browser, and the communication with the application via the network is independent of the network browser. Moreover, if the received transaction information matches the original transaction information, the computer system receives approval for the transaction from the computer via the network.

20 Claims, 5 Drawing Sheets

AUTHENTICATION OF TRANSACTIONS IN A NETWORK

BACKGROUND

The present invention relates to techniques for authenticating transactions in a network, such as the Internet.

Online financial transactions are increasingly popular. For example, consumers and businesses are benefiting from the convenience associated with services such as Internet banking and e-commerce.

In a typical online financial transaction, a user interacts with a web page, which is provided by a server that is associated with a business, via a web browser that executes in the user's computer. In particular, the user provides information associated with the financial transaction in fields in the web page using a user-interface device, such as a keyboard. In addition, information associated with the financial transaction may be pre-populated in the fields by the server based on previous financial transactions between the business and the user. Moreover, prior to completing the financial transaction, the information is usually presented to the user in the web page for the user's review and approval.

Historically, security during the financial transaction has largely focused on ensuring that the user accesses the correct uniform resource locator (and thus the web page) associated with the business, and encrypting the communication between the user's computer and the server. For example, the financial transaction may be conducted using a cryptographic protocol, such as Secure Sockets Layer (SSL), which validates the identity of the web page and creates a secure encrypted connection or channel for communicating financial information (such as credit-card information).

However, recently a new class of computer virus has been developed which can make web browsers unsafe for financial transactions. These viruses, such as the ZeuS Trojan, change data entered by the user prior to the secure channel between the server and the user's computer. In particular, the ZeuS Trojan is a browser-helper-object virus that disassociates the bits corresponding to the information associated with the financial transaction from the pixels displayed by the web browser by manipulating the document object model (DOM) in the web browser. In the process, the information that the user sees presented in the web page is different from the information that is sent to the server. This form-grabbing technique allows viruses such as the ZeuS Trojan to modify the information so that, for example, a wire transfer is routed to a different bank account (as a consequence, viruses, such as the ZeuS Trojan, are sometimes referred to as 'crimeware').

Furthermore, current anti-virus software is often unable to detect when the user's computer is infected with a browser-helper-object virus. Consequently, browser-helper-object viruses are a rapidly growing threat which can undermine the convenience and cost savings associated with online financial transactions, and therefore threaten an increasingly important commercial channel.

SUMMARY

The disclosed embodiments relate to a computer system that facilitates conducting a transaction via a network. During operation the computer system receives transaction information associated with the transaction via the network from a network browser in a computer. In response, the computer system provides an encrypted version of the received transaction information via the network to an application that executes in the computer, which facilitates comparing the received transaction information with original transaction information provided by a user to the computer. Note that the communication with the application via the network is independent of the network browser, and the application is separate from the network browser. If the received transaction information matches the original transaction information, the computer system receives approval for the transaction from the computer via the network.

In some embodiments the network includes the Internet or an intranet. Moreover, the transaction may include a financial transaction, such as: clearing of a negotiable instrument by a clearing house, a wire transfer, and/or a credit-card transaction. However, in other embodiments the transaction may include a non-financial transaction, such as changing contact information of the user.

Note that the approval for the transaction may be received from the user using the network browser. For example, the received approval for the transaction may include an approval code that is provided by the application to the user, or that is provided to the user via: a text message, a voice message and/or an email. Then, the user provides the approval code to the computer system, for example, using the network browser. Alternatively, the received approval for the transaction may be provided by the application in response to the user activating an icon displayed by the application.

Furthermore, the encrypted version of the received transaction information may be encrypted using an encryption key that is included in an applet that is associated with the transaction. In some embodiments, a name of the applet and a position of the encryption key in the applet are modified when the user performs one or more transactions using the network browser. These modifications of the name and the position may be random or pseudorandom. Moreover, information corresponding to an encryption key for the encrypted version of the received transaction information may be provided to the user using a separate communication channel from the network.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for conducting a transaction via a network, and a computer-program product (e.g., software) for use with the computer system are described. In this technique, in response to receiving transaction information associated with the transaction via the network from a network browser in a computer, the computer system provides an encrypted version of the received transaction information via the network to an application that executes in the computer, which facilitates a comparison of the received transaction information with original transaction information provided by a user to the computer. Note that this application is separate from the network browser, and the communication with the application via the network is independent of the network browser. Moreover, if the received transaction information matches the original transaction information, the computer system receives approval for the transaction from the computer via the network.

This transaction technique may solve the problem of browser-helper-object viruses, such as the Zeus Trojan. In particular, by providing authentication of information for the transaction independently from the network browser, this transaction technique may make it more difficult for browser-helper-object viruses to perpetrate fraud by modifying the original transaction information provided by the user, thereby improving network security, and customer and provider confidence in the reliability and trustworthiness of the transactions conducted via the network. Consequently, the transaction technique may facilitate commerce, such as e-commerce and electronic banking.

Figure 1:
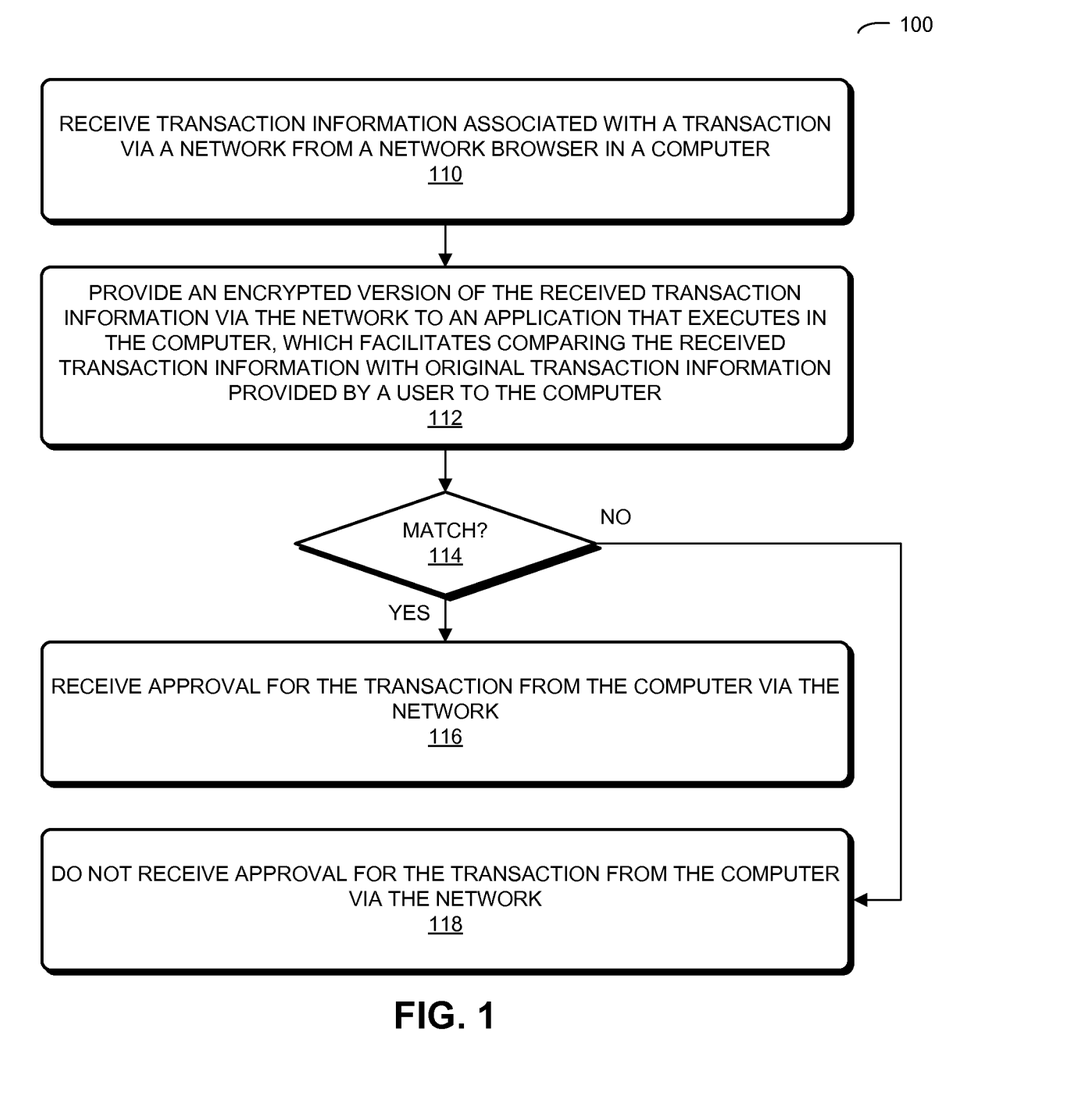
FIG. 1 is a flow chart illustrating a method for conducting a transaction via a network in accordance with an embodiment of the present invention.

We now describe embodiments of the method. FIG. 1 presents a flow chart illustrating a method 100 for conducting a transaction via a network, which may be performed by a computer system (such as server 212 in FIG. 2 and/or computer system 400 in FIG. 4). During operation, the computer system receives transaction information associated with the transaction via the network from a network browser (such as a web browser) in a computer (operation 110). In response, the computer system provides an encrypted version of the received transaction information via the network to an application that executes in the computer (operation 112), which facilitates comparing the received transaction information with original transaction information provided by a user to the computer. Note that the communication with the application via the network is independent of the network browser, and the application is separate from the network browser. If the received transaction information matches the original transaction information (operation 114), the computer system receives approval for the transaction from the computer via the network (operation 116). Otherwise (operation 114), the computer system may not receive approval for the transaction (operation 118). In this way, method 100 may authenticate the transaction independently from the network browser, thereby improving security in the face of threats such as browser-helper-object viruses.

In some embodiments, the network includes the Internet or an intranet. Moreover, the transaction may include a financial transaction, such as: clearing of a negotiable instrument (such as a check) by a clearing house, a wire transfer, and/or a credit-card transaction. However, in other embodiments the transaction may include a non-financial transaction, such as changing contact information of the user (for example, a phone number, an email address and/or a mailing address).

Note that the approval for the transaction (operation 116) may be received from the user using the network browser. For example, the application may provide an approval code to the user if the user indicates that the received transaction information matches the original transaction information, such as by activating an 'ok' icon that is displayed by the application. (In some embodiments, the approval code is provided to the user via another communication channel, such as via a voice message or a phone call; an email; and/or a text message or, more generally, via a Short Message System communication technique.) Then, the user may provide the approval code to the computer system, for example, by entering it into a web page displayed by the network browser using a user-interface device, such as a keyboard.

Alternatively, the received approval for the transaction (operation 116) may be provided by the application to the computer system in response to the user activating an icon (such as the 'ok' icon) display by the application.

Furthermore, the encrypted version of the received transaction information (operation 112) may be encrypted using an encryption key that is included in an applet that is associated with the transaction. For example, when the user initiates the transaction via the network browser (such as by activating an icon in a web page provided by the computer system), the computer system may provide the applet to the user's computer. This applet may be a Java™-language applet (a trademark of Sun Microsystems, Inc.), i.e., a Java class or program that is downloaded by the network browser in response to HyperText Markup Language (HTML) in the web page. Moreover, the applet may be launched and executed in a Java-runtime environment by a Java virtual machine in conjunction with or separately from the application (which may be a Java application) that was previously installed on and that executes on the computer. Consequently, the application and/or the applet are sometimes referred to as a 'Java Client for Authentication of Transactions' (JCAT).

In some embodiments, the applet may be modified intermittently, periodically, or each time a transaction is initiated. For example, the name of the applet and the position(s) of the encryption key in the applet may be modified when the user performs one or more transactions using the network browser. These modifications of the name and the position(s) may be random or pseudorandom. As described further below, the modifications may include 'newspapering' and/or another technique for obfuscating the location(s) of the encryption key within the applet. Alternatively, the encryption key may be included in a contiguous region in the applet.

Moreover, information corresponding to the encryption key for the encrypted version of the received transaction information may be provided to the user using a separate communication channel from the network. For example, the encryption key and/or the position of the encryption key in a current version of the applet may be provided to the user via: a voice message or a phone call; an email; and/or a text message (or, more generally, via a Short Message System communication technique).

Note that the intent of the random or pseudorandom modifications is to make it more difficult for a browser-helper-object virus to defeat the transaction authentication in real time, i.e., while the transaction is being performed.

In some embodiments of method 100, there may be additional or fewer operations. Moreover, the order of the operations may be changed and/or two or more operations may be combined into a single operation.

Figure 2:
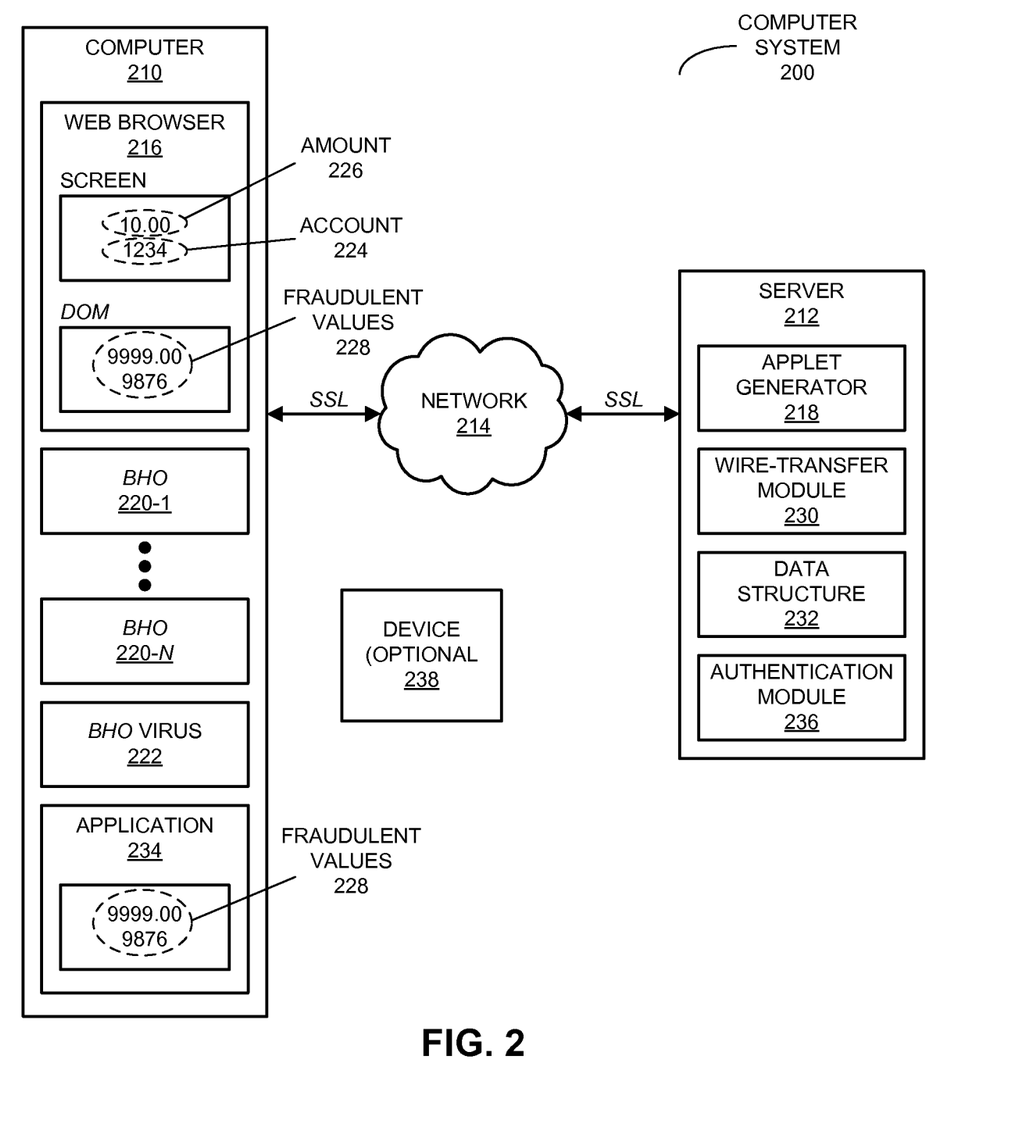
FIG. 2 is a block diagram illustrating a computer system that performs the method of FIG. 1 in accordance with an embodiment of the present invention.

We now describe embodiments of the computer system and its use. FIG. 2 presents a block diagram illustrating a computer system 200 that performs method 100 (FIG. 1). This computer system may provide an alternative communication channel (i.e., an out-of-browser communication channel) to the user for transaction authentication. In the discussion that follows, a wire transfer is used as an illustrative example of the transaction.

The user of computer 210 may initiate the wire transfer by accessing a uniform resource locator (URL) associated with a financial institution using a web browser 216 that is resident on and that executes on computer 210. In particular, the user may access a server 212 (which is associated with the financial institution) via network 214. A wire-transfer module 230 in this server may provide a web page (or instructions associated with it) to computer 210 via network 214 for display by web browser 216. This web page may be communicated with a Secure Sockets Layer (SSL) connection, and may include a Java applet (such as a Java class or program) that includes an embedded encryption key that is generated or selected by applet generator 218. Note that web browser 216 may execute in combination with one or more browser-helper objects (BHOs) 220. In addition, if computer 210 is infected, there may be a browser-helper-object virus 222.

Then, the user may request a wire-entry form by activating a 'wire-transfer icon' that is displayed in the web page. In response to the user request, the web page displayed by web browser 216 may be modified to display the wire-entry form. Subsequently, the user may provide data associated with the wire transfer (such as an account 224, the financial institution and a wire-transfer amount 226) to computer 210 using a user-interface device, such as a keyboard. This entered data may be displayed in one or more fields in the wire-entry form in the web page.

When the user submits the form (for example, by activating an appropriate icon on the web page), browser-helper-object virus 222 may modify the document object model (DOM), and thus the POST data, to fraudulent values 228 (which may specify a different account, financial institution and/or wire-transfer amount). Note that browser-helper-object virus 222 may modify the values displayed by web browser 216 so that they match the entered data (as opposed to fraudulent values 228). Therefore, in the absence of JCAT, the user may not be able to determine that the data sent to server 212 is fraudulent.

Wire-transfer module 230 in server 212 may receive the fraudulent values via network 214, and may store them in a data structure 232. (This data structure may also store the encryption key that was embedded in the applet by applet generator 218.) Moreover, the response HTML may include an OBJECT tag for the applet. Thus, the URL may not reference an extant, static Java ARchive (JAR) file with Java classes and associated metadata. Instead, it may reference applet generator 218.

Next, the applet, which may be executed in a Java-runtime environment by a Java virtual machine in conjunction with or separately from Java application 234 that was previously installed (or downloaded) and is resident on computer 210, may request a copy of the data received by server 212. (Note that application 234 may not be related to web browser 216. Thus, it can be a stand-alone application.) This data may be provided to the applet by authentication module 236 via network 214, and may be encrypted using the encryption key that was included in the applet. In some embodiments, server 212 maintains a persistent connection with one or more applications (such as application 234) on user computers (such as computer 210).

The applet may decrypt the data using the encryption key in the applet. To do so, in some embodiments the applet may first assemble the encryption key in the applet using information provided by server 212. For example, if the encryption key is embedded at a random or pseudorandom position(s) in the applet, the applet may assemble the encryption key using information that is provided by server 212 to the user via an optional device 238 (such as a cellular telephone). In some embodiments, the encryption key may be embedded in the applet using a 'newspapering' technique in which the encryption key is hidden at one or more positions within the applet code, and the user may be provided with information corresponding to these positions (such as a block of text and a list of integers) via optional device 238. In an exemplary embodiment, encryption of the data received by server 212 may use a symmetric encryption key, such as: the triple data encryption standard (3DES), the advanced encryption standard (AES), the international data encryption algorithm (IDEA), etc. However, as is known in the art, a wide variety of encryption techniques may be used.

Furthermore (as described further below with reference to FIG. 3), the applet may display the decrypted data in application 234 (which in this case is fraudulent values 228). The user may be requested to confirm that the displayed wire-transfer data in application 234 matches the values displayed in web browser 216. If the user indicates that this is the case (for example, by activating an 'ok' icon), an approval code (for example, a pass code that can be used once) may be displayed by application 234. The user may enter this approval into web browser 216 to authenticate the wire transfer. Then, if the approval code received from web browser 216 by server 212 via network 214 is correct, authentication module 236 may allow the wire transfer to be performed. Alternatively, when the user activates the 'ok' icon, application 234 may provide the approval code to server 212 via network 214.

Thus, JCAT can provide transaction authentication even when computer 210 is infected with browser-helper-object virus 222 using an out-of-browser communication channel to the user. Moreover, in some embodiments this out-of-browser communication channel may not involve additional devices, such as optional device 238. This additional security and convenience may offer increased sales and/or additional revenue for a provider of JCAT (such as the financial institution), as well as reduced costs and/or financial liability.

While the authentication technique may still be affected by other types of viruses, such as a so-called 'root-kit virus' (in the boot sector of a hard-disk drive) that has root-privileges in the operating system on computer 210, it is much harder to develop viruses that affect the operating system (as opposed to web browser 216). In addition, operating-system viruses tend to be more specific to particular environments (i.e., hardware and software configurations), as opposed to browser viruses (which are more universal). Nonetheless, to address such problems, the preceding authentication technique may be used in conjunction with other security techniques, such as a web-browser firewall. In some embodiments, further protection may be offered by: storing the applet and/or the entered data on computer 210 (for example, in a cache) for a few transactions in order to improve performance by reducing server 212 overhead; randomly or pseudorandomly changing the font and/or placement of information in a window associated with application 234; randomly or pseudorandomly changing the location of the window on a display in computer 210; and/or only providing a portion of the encryption key explicitly to the user (e.g., there may be a public portion of the encryption key and a private portion).

In some embodiments, prior to performing the wire transfer application 234 may establish an SSL connection with server 212, and may receive an association code. The user can enter this association code into web browser 216. This association code may be maintained in the session data, and therefore may be used to associate application 234 with a web-browser session.

Note that the web page used to conduct the wire transfer may be associated with a financial-software application. At least a portion of this financial-software application may be a stand-alone application that is resident on and which executes on computer 210. In some embodiments, at least a portion of the financial-software application may be a software application tool (such as a financial-software application tool) that is embedded in the web page (and which executes in a virtual environment of web browser 216). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by web browser 216 or another client application (such as on computer 210). Thus, the financial-software application may be provided to the user via a client-server architecture.

While data structure 232 is illustrated in server 212, in other embodiments the information in data structure 232 may be stored at one or more locations in computer system 200 (i.e., locally or remotely).

Figure 3:
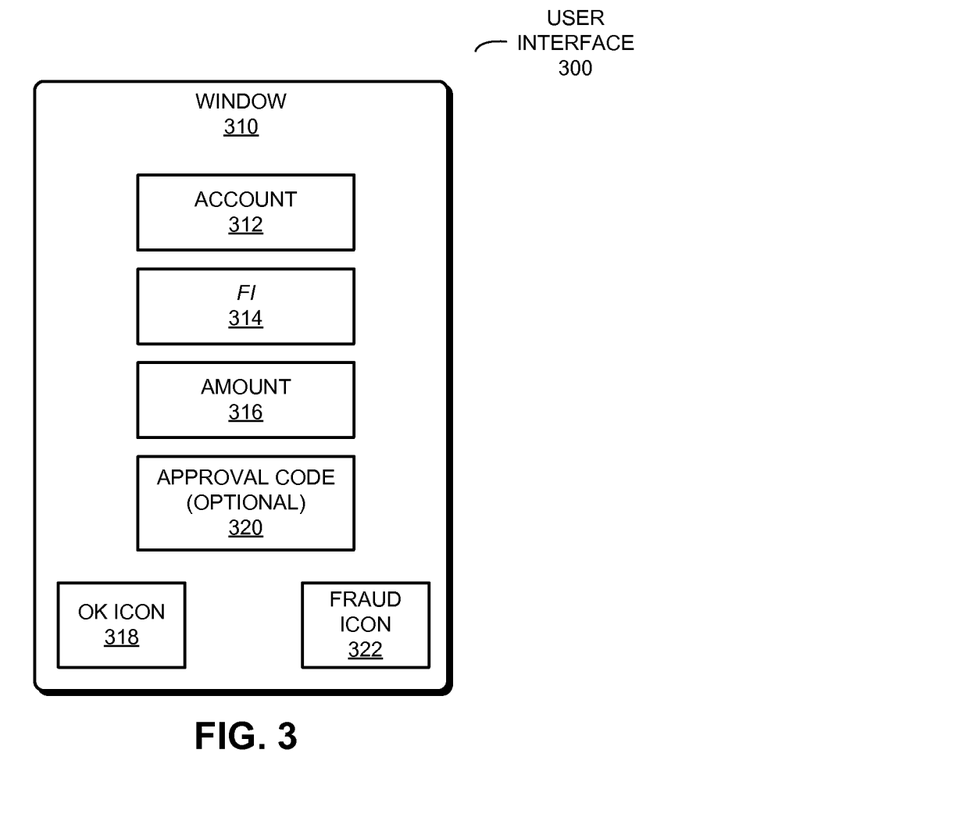
FIG. 3 is a block diagram illustrating a user interface associated with an application that is associated with the method of FIG. 1 in accordance with an embodiment of the present invention.

We now describe an example of a user interface. FIG. 3 presents a block diagram illustrating a user interface 300 associated with application 234 (FIG. 2). This user interface may include a communicator-like window 310. Authentication module 236 (FIG. 2) may provide content (such as data associated with a wire transfer that was received by server 212 in FIG. 2) to window 310 without any explicit user action. For example, account 312, financial institution (FI) 314 and wire-transfer amount 316 associated with the wire transfer may be displayed in window 310. If the user indicates that this information matches the original information provided by the user to web browser 216 (FIG. 2), for example, by activating 'ok' icon 318, an optional approval code 320 may be displayed in window 310. As discussed previously, the user may enter this optional approval code into web browser 216 (FIG. 2), thereby authenticating the wire transfer. Alternatively, the user may activate a 'fraud' icon 322 to report to server 212 (FIG. 2) that account 312, financial institution 314 and/or wire-transfer amount 316 do not match the original information provided by the user to web browser 216 (FIG. 2). In this case, the wire transfer may be cancelled, and the user may be prompted to call the financial institution.

Figure 4:
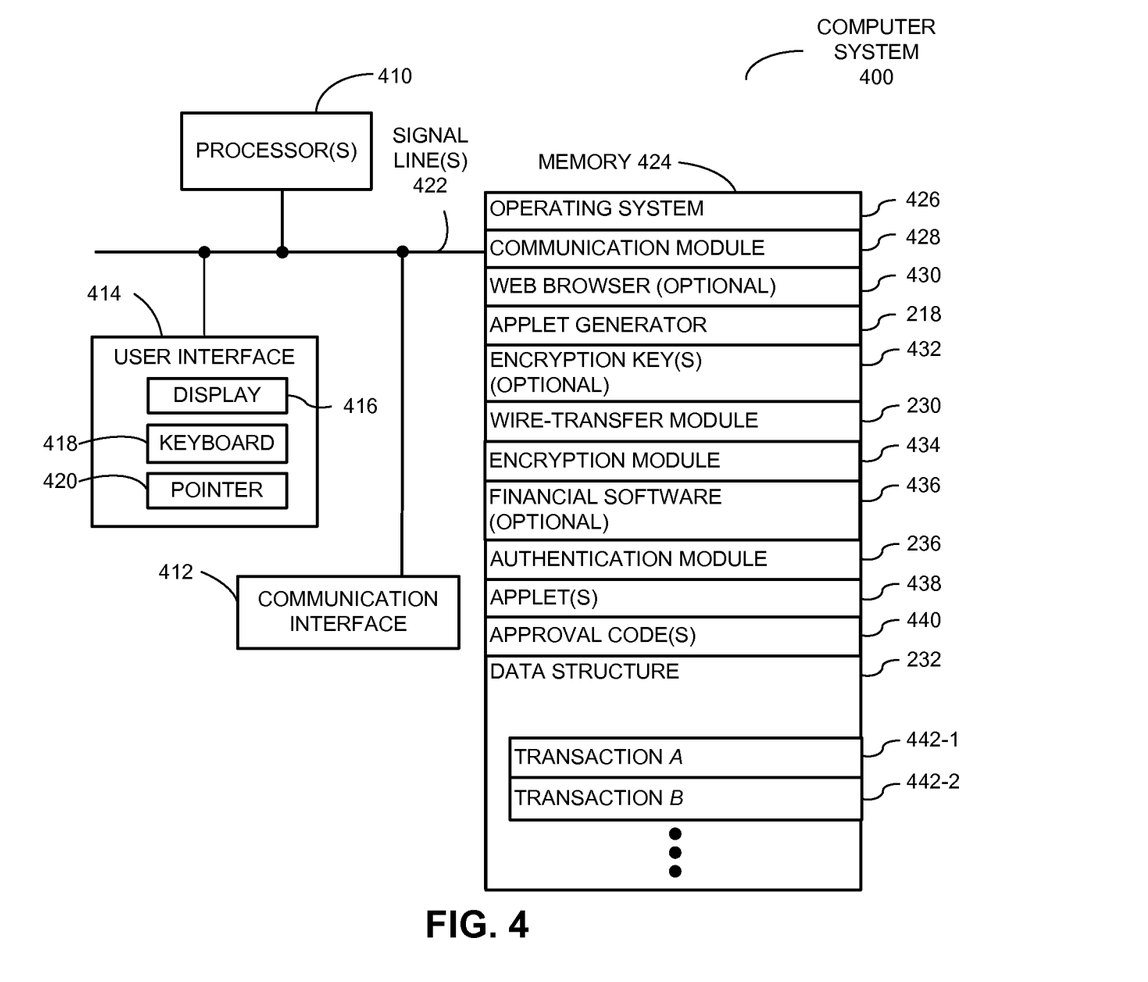
FIG. 4 is a block diagram illustrating a computer system that performs the method of FIG. 1 in accordance with an embodiment of the present invention.

We now further describe embodiments of the computer system. FIG. 4 presents a block diagram illustrating a computer system 400 that performs method 100 (FIG. 1), such as server 212 (FIG. 2). Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400. In addition, memory 424 may include an optional web browser 430, which can be downloaded by the user.

Memory 424 may also include multiple program modules (or sets of instructions), including: applet generator 218 (or a set of instructions), wire-transfer module 230 (or a set of instructions), encryption module 434 (or a set of instructions), optional financial software 436 (or a set of instructions) and/or authentication module 236 (or a set of instructions). Note that one or more of these program modules (or sets of instructions) may constitute a computer-program mechanism.

During operation of computer system 400, the user may initiate a transaction (such as a wire transfer). In response, wire-transfer module 230 may provide the web page that includes the wire-transfer form. This web page may also include one of applets 438 that is generated by applet generator 218. Furthermore, the applet may include an encryption key that is dynamically generated by encryption module 434 or that is selected by applet generator 218 from optional predetermined encryption keys 432.

Subsequently, wire-transfer module 230 may receive data or information associated with the wire transfer from the user via communication module 428. This information may be stored in data structure 232, such as information for transaction A 442-1 or information for transaction B 442-2. As noted previously, data structure 232 may also store the encryption key that was included or embedded in the applet.

Next, authentication module 236 may receive a request from the applet executing in the Java-runtime environment by the Java virtual machine in conjunction with or separately from the Java application on the user's computer for an encrypted copy of the received information. This information may be encrypted using the encryption key by encryption module 434, and provided to the user's computer by authentication module 236 using communication module 428.

After decryption at the user's computer, the user may compare the received information with the original information provided by the user when the user filled in the wire-transfer form in the web page. If the received information matches the original information, the user may activate an 'ok' icon that is displayed by the application. In response, encryption module 434 may encrypt one of approval codes 440 and provide it to the application via communication module 428. (Alternatively, one of approval codes 440 may be included in the applet when it is first provided to the user's computer.) Then, the user may provide this approval code to authentication module 236 by entering it into the web page, or the application executing on the user's computer may provide the approval code to authentication module 236 using communication module 428, either of which may authenticate the wire transfer. In response, authentication module 236 may allow the wire transfer to be performed by wire-transfer module 230.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computers and servers in computer systems 200 (FIG. 2) and/or 400 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 214 (FIG. 2) may include: the Internet, World Wide Web (WWW), an intranet, LAN, WAN, MAN, or a combination of networks, or other technology enabling communication between computing systems.

In exemplary embodiments, the web page is associated with a financial-software application (i.e., optional financial software 436). This financial-software application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Computer systems 200 (FIG. 2) and/or 400 may include fewer components or additional components. For example, while the implementation in computer system 200 (FIG. 2) included the applet and application 234 (FIG. 2), in other embodiments one or the other is used. Thus, transaction authentication in computer system 200 (FIG. 2) may involve: an applet by itself (which is executed by a Java Virtual Machine), application 234 (FIG. 2) by itself, or the applet in conjunction with application 234 (FIG. 2). Moreover, two or more components may be combined into a single component, and/or a position of one or more components may be changed. In some embodiments, the functionality of the computer systems 200 (FIG. 2) and/or 400 may be implemented more in hardware and less in software, or less in hardware and more in software, as is known in the art.

Figure 5:
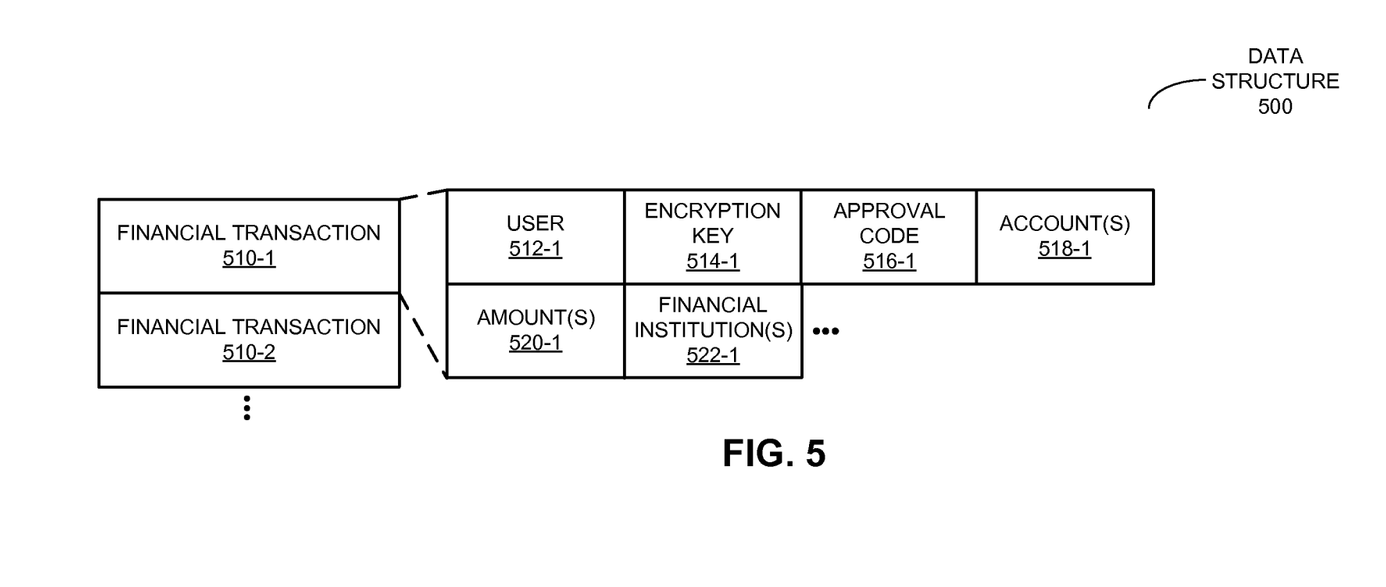
FIG. 5 is a block diagram illustrating a data structure for use in the computer system of FIG. 4 in accordance with an embodiment of the present invention.

We now discuss a data structure. FIG. 5 presents a block diagram illustrating a data structure 500 for use in computer system 400 (FIG. 4). This data structure may include information for financial transactions 510. For example, information for financial transaction 510-1 may include: user 512-1, encryption key 514-1, approval code 516-1, one or more accounts 518-1, one or more amounts 520-1 and/or one or more associated financial institutions 522-1.

In some embodiments of data structure 500, there may be fewer or additional components. Moreover, two or more components may be combined into a single component and/or a position of one or more components may be changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for conducting a transaction via a network, comprising:
   a server computer receiving transaction information associated with the transaction via the network from a network browser executing on a client computer via a first communication session;
   in response to receiving the transaction information, the server computer causing an application executing on the client computer to display, at the client computer, a copy of the received transaction information by sending back the copy of the received transaction information via the network to the application via a second communication session, wherein the first communication session and the second communication session are different, wherein communications between the network browser and the server computer are independent of communications between the application and the server computer, and wherein the application is separate from the network browser;

the server computer receiving a response from the network browser via the network using the first communication session; and the server computer conditionally performing the transaction based on the response.

2. The method of claim 1, wherein the network includes the Internet or an intranet.

3. The method of claim 1, wherein the transaction includes a financial transaction.

4. The method of claim 3, wherein the financial transaction includes clearing of a negotiable instrument by a clearing house.

5. The method of claim 3, wherein the financial transaction includes a wire transfer.

6. The method of claim 3, wherein the financial transaction includes a credit-card transaction.

7. The method of claim 1, wherein the transaction includes a non-financial transaction.

8. The method of claim 7, wherein the non-financial transaction includes changing contact information of the user.

9. A non-transitory computer-readable storage medium storing instructions that, when executed by a server computer, cause the server computer to perform a method for conducting a transaction via a network, the method comprising:

receiving transaction information associated with the transaction via the network from a network browser executing on a client computer via a first communication session;

in response to receiving the transaction information, causing an application executing on the client computer to display, at the client computer, a copy of the received transaction information by sending back the copy of the received transaction information via the network to the application via a second communication session, wherein the first communication session and the second communication session are different, wherein communications between the network browser and the server computer are independent of communications between the application and the server computer, and wherein the application is separate from the network browser;

receiving a response from the network browser via the network using the first communication session; and conditionally performing the transaction based on the response.

10. The non-transitory computer-readable storage medium of claim 9, wherein the network includes the Internet or an intranet.

11. The non-transitory computer-readable storage medium of claim 9, wherein the transaction includes a financial transaction.

12. The non-transitory computer-readable storage medium of claim 9, wherein the transaction includes a non-financial transaction.

13. A server computer, comprising:
a processor; and
a non-transitory computer-readable storage medium storing instructions that, when executed by the processor, cause the server computer to perform a method for conducting a transaction via a network, the method comprising:

receiving transaction information associated with the transaction via the network from a network browser in a client computer via a first communication session;

in response to receiving the transaction information, causing an application executing on the client computer to display, at the client computer, a copy of the received transaction information by sending back the copy of the transaction information via the network to the application via a second communication session, wherein the first communication session and the second communication session are different, wherein communications between the network browser and the server computer are independent of communications between the application and the server computer, and wherein the application is separate from the network browser;

receiving a response from the network browser via the network using the first communication session; and conditionally performing the transaction based on the response.

14. The method of claim 1, wherein the communications between the application and the server computer are performed over a secure communication channel.

15. The non-transitory computer-readable storage medium of claim 9, wherein the communications between the application and the server computer are performed over a secure communication channel.

16. The server computer of claim 13, wherein the communications between the application and the server computer are performed over a secure communication channel.

17. The method of claim 1, wherein prior to receiving the transaction information, the server sends an association code to the application via the network to the client computer, and wherein the association code facilitates an association between the first and second communication sessions.

18. The method of claim 1, wherein the response comprises an approval code entered by a user at the network browser,
wherein, responsive to receiving the approval code from the network browser via the network, the server computer performs the transaction, and
wherein the transaction information does not include the approval code.

19. The method of claim 1, wherein, while displaying the copy of the received transaction information at the client computer, the application prompts a user at the client computer to confirm that the copy of the received transaction information matches user-provided information for the transaction entered by the user at the network browser.

20. The method of claim 1, further comprising:
the server computer providing to the client computer executable code for the application, wherein the executable code includes a decryption key at a given location in the executable code; and
separately from the copy of the received transaction information, the server computer providing to a user of the client computer information that identifies the given location,
wherein, prior to sending back the copy of the received transaction information to the application, the server computer encrypts the received transaction information with an encryption key corresponding to the decryption key, and wherein the application uses the information that identifies the given location to retrieve the decryption key and uses the decryption key to decrypt the encrypted received transaction information.

* * * * *